US007536352B2

(12) United States Patent

Lapsley et al.

(10) Patent No.: US 7,536,352 B2

(45) Date of Patent: *May 19, 2009

(54) TOKENLESS BIOMETRIC ELECTRONIC FINANCIAL TRANSACTIONS VIA A THIRD PARTY IDENTICATOR

(75) Inventors: Philip D. Lapsley, Oakland, CA (US); Jonathan Alexander Lee, Oakland, CA (US); David Ferrin Pare, Jr., Berkeley, CA (US); Ned Hoffman, Sebastopol, CA (US)

(73) Assignee: YT Acquisition Corporation, Delray Beach, FL (US)

( * ) Notice: Subject to any disclaimer, the term of this patent is extended or adjusted under 35 U.S.C. 154(b) by 606 days.

This patent is subject to a terminal disclaimer.

(21) Appl. No.: 11/109,096

(22) Filed: Apr. 18, 2005

(65) Prior Publication Data

US 2005/0187843 A1 Aug. 25, 2005

Related U.S. Application Data

(63) Continuation of application No. 09/731,536, filed on Dec. 6, 2000, now Pat. No. 6,950,810, which is a continuation-in-part of application No. 09/239,570, filed on Jan. 29, 1999, now Pat. No. 6,269,348, which is a continuation of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345, 523, filed on Nov. 28, 1994, now Pat. No. 5,615,277.

(51) Int. Cl.
*G06Q 40/00* (2006.01)

(52) U.S. Cl. ............................ 705/44; 705/78; 705/64; 705/65; 705/67; 382/115; 235/380

(58) Field of Classification Search ...................... None
See application file for complete search history.

(56) References Cited

U.S. PATENT DOCUMENTS

| | | | |
|---|---|---|---|
| 3,639,905 | A | 2/1972 | Yaida et al. |
| 3,876,864 | A | 4/1975 | Clark et al. |
| 3,943,335 | A | 3/1976 | Kinker et al. |
| 3,975,711 | A | 8/1976 | McMahon |
| 4,151,512 | A | 4/1979 | Riganati et al. |
| 4,208,651 | A | 6/1980 | McMahon |
| 4,227,805 | A | 10/1980 | Schiller |
| 4,321,672 | A | 3/1982 | Braun |
| 4,322,163 | A | 3/1982 | Schiller |
| 4,353,056 | A | 10/1982 | Tsikos |
| 4,358,677 | A | 11/1982 | Ruell et al. |
| 4,390,968 | A | 6/1983 | Hennessy |
| 4,429,413 | A | 1/1984 | Edwards |
| 4,484,328 | A | 11/1984 | Schlafly |
| 4,537,484 | A | 8/1985 | Fowler et al. |
| 4,544,267 | A | 10/1985 | Schiller |
| 4,618,988 | A | 10/1986 | Schiller |
| 4,649,563 | A | 3/1987 | Riskin |
| 4,675,815 | A | 6/1987 | Kuroki |
| 4,696,046 | A | 9/1987 | Schiller |
| 4,699,149 | A | 10/1987 | Rice |
| 4,720,869 | A | 1/1988 | Wadia |
| 4,728,186 | A | 3/1988 | Eguchi et al. |
| 4,734,858 | A | 3/1988 | Schlafly |
| 4,747,050 | A | 5/1988 | Brachtl et al. |
| 4,752,966 | A | 6/1988 | Schiller |
| D298,536 | S | 11/1988 | Brefka |
| 4,784,484 | A | 11/1988 | Jensen |
| 4,799,156 | A | 1/1989 | Shavit et al. |
| 4,805,223 | A | 2/1989 | Denyer |
| 4,821,118 | A | 4/1989 | Lafreniere |
| 4,837,422 | A | 6/1989 | Dethloff et al. |
| 4,845,636 | A | 7/1989 | Walker |
| 4,868,376 | A | 9/1989 | Lessin et al. |
| 4,926,480 | A | 5/1990 | Chaum |
| 4,946,276 | A | 8/1990 | Chilcott |
| 4,947,028 | A | 8/1990 | Gorog |
| 4,961,142 | A | 10/1990 | Elliott et al. |
| 4,993,068 | A | 2/1991 | Piosenka et al. |
| 4,995,086 | A | 2/1991 | Lilley et al. |
| 4,998,279 | A | 3/1991 | Weiss |
| 5,025,372 | A | 6/1991 | Burton |

INPUT PAYOR BIOMETRIC 702
INPUT PAYOR PIN 704
TRANSMIT PAYOR BIO-PIN AND PAYEE HARDWARE ID TO DPC 720
DPC IDENTIFIES PAYOR AND RETRIEVES FINANCIAL ACCOUNT IDENTIFIERS 706
DPC IDENTIFIES PAYEE VIA HARDWARE ID 712
DPC TRANSMITS FINANCIAL ACCOUNT IDENTIFIERS TO PAYEE 708
ENTER TRANSACTION AMOUNT 710
SELECT FINANCIAL ACCOUNT 714
PIA TRANSMITS SELECTED FINANCIAL ACCOUNT IDENTIFIER TO STORE PAYMENT SYSTEM 724
STORE PAYMENT SYSTEM FORWARDS SELECTED FINANCIAL ACCOUNT IDENTIFIER TO FINANCIAL TRANSACTION PROCESSOR 806
TRANSACTION IS EXECUTED 808

5,036,461 A 7/1991 Elliott et al.
5,054,089 A 10/1991 Uchida et al.
5,054,090 A 10/1991 Knight et al.
5,073,950 A 12/1991 Colbert et al.
5,077,803 A 12/1991 Kato et al.
5,088,817 A 2/1992 Igaki et al.
5,095,194 A 3/1992 Barbanell
5,103,486 A 4/1992 Grippi
5,105,467 A 4/1992 Kim et al.
5,109,427 A 4/1992 Yang
5,109,428 A 4/1992 Igaki et al.
5,144,680 A 9/1992 Kobayashi
5,146,102 A 9/1992 Higuchi et al.
5,161,204 A 11/1992 Hutcheson et al.
5,168,520 A 12/1992 Weiss
5,180,901 A 1/1993 Hiramatsu
5,191,611 A 3/1993 Lang
5,210,588 A 5/1993 Lee
5,210,797 A 5/1993 Usui et al.
5,222,152 A 6/1993 Fishbine et al.
5,224,164 A 6/1993 Elsner
5,224,173 A 6/1993 Kuhns et al.
5,229,764 A 7/1993 Matchett et al.
5,230,025 A 7/1993 Fishbine
5,239,583 A 8/1993 Parrillo
5,241,606 A 8/1993 Horie
5,251,259 A 10/1993 Mosley
D340,919 S 11/1993 Lee
5,265,162 A 11/1993 Bush et al.
5,267,324 A 11/1993 Kumagai
5,274,695 A 12/1993 Green
5,276,314 A 1/1994 Martino et al.
5,280,527 A 1/1994 Gullman et al.
5,321,242 A 6/1994 Heath, Jr.
5,321,765 A 6/1994 Costello
5,325,442 A 6/1994 Knapp
5,329,589 A 7/1994 Fraser et al.
5,335,288 A 8/1994 Faulkner
5,343,529 A 8/1994 Goldfine et al.
5,351,303 A 9/1994 Willmore
5,354,974 A 10/1994 Eisenberg
5,359,669 A 10/1994 Shanley et al.
5,371,797 A 12/1994 Bocinsky, Jr.
5,383,113 A 1/1995 Kight et al.
5,386,104 A 1/1995 Sime
5,400,662 A 3/1995 Tamori
5,412,738 A 5/1995 Brunelli et al.
5,416,573 A 5/1995 Sartor, Jr.
5,429,006 A 7/1995 Tamori
5,457,747 A * 10/1995 Drexler et al. ............. 713/186
5,465,303 A 11/1995 Levison et al.
5,484,988 A 1/1996 Hills et al.
5,485,510 A 1/1996 Colbert
D367,044 S 2/1996 Arakaki
5,493,621 A 2/1996 Matsumura
5,499,288 A 3/1996 Hunt et al.
5,513,272 A 4/1996 Bogosian, Jr.
5,517,558 A 5/1996 Schalk
5,533,123 A 7/1996 Force et al.
5,546,471 A 8/1996 Merjanian
5,546,523 A 8/1996 Gatto
5,561,718 A 10/1996 Trew et al.
5,572,597 A 11/1996 Chang et al.
5,577,120 A 11/1996 Penzias
5,602,933 A 2/1997 Blackwell et al.
5,604,802 A 2/1997 Holloway
5,613,012 A 3/1997 Hoffman et al.
5,615,277 A 3/1997 Hoffman
5,621,812 A 4/1997 Deaton et al.
5,635,723 A 6/1997 Fujieda et al.
5,636,038 A 6/1997 Lynt et al.
5,636,282 A 6/1997 Holmquist
5,650,217 A 7/1997 Skrivanek et al.
5,719,950 A 2/1998 Osten et al.
5,745,555 A 4/1998 Mark
5,748,780 A 5/1998 Stolfo
5,757,917 A 5/1998 Rose et al.
5,764,789 A 6/1998 Pare, Jr. et al.
5,768,134 A 6/1998 Swaelens et al.
5,790,668 A 8/1998 Tomko
5,794,207 A 8/1998 Walker et al.
5,796,857 A 8/1998 Hara
D397,682 S 9/1998 Yotukura
5,802,199 A 9/1998 Pare, Jr. et al.
5,805,719 A 9/1998 Pare, Jr. et al.
D400,191 S 10/1998 Butts et al.
5,822,737 A 10/1998 Ogram
5,825,907 A 10/1998 Russo
5,825,924 A 10/1998 Kobayashi
5,826,241 A 10/1998 Stein et al.
5,826,245 A 10/1998 Sandberg-Diment
5,838,812 A 11/1998 Pare, Jr. et al.
5,844,287 A 12/1998 Hassan et al.
5,845,005 A 12/1998 Setlak et al.
5,848,400 A 12/1998 Chang
5,850,442 A 12/1998 Muftic
5,870,723 A 2/1999 Pare, Jr. et al.
5,892,824 A 4/1999 Beatson et al.
5,892,838 A 4/1999 Brady
5,926,555 A 7/1999 Ort et al.
5,930,804 A 7/1999 Yu et al.
5,956,700 A 9/1999 Landry
5,982,914 A 11/1999 Lee et al.
5,986,746 A 11/1999 Metz et al.
5,991,372 A 11/1999 Davenport D'Ingianni et al.
6,011,858 A 1/2000 Stock et al.
6,012,039 A 1/2000 Hoffman et al.
6,016,476 A 1/2000 Maes et al.
6,023,688 A 2/2000 Ramachandran et al.
6,028,950 A 2/2000 Merjanian
6,029,195 A 2/2000 Herz
6,040,783 A 3/2000 Houvener et al.
6,045,039 A 4/2000 Stinson et al.
6,052,675 A 4/2000 Checchio
6,072,894 A 6/2000 Payne
6,084,967 A 7/2000 Kennedy et al.
6,105,010 A 8/2000 Musgrave
6,111,977 A 8/2000 Scott et al.
6,119,096 A 9/2000 Mann et al.
6,154,879 A 11/2000 Pare, Jr. et al.
6,182,076 B1 1/2001 Yu et al.
6,202,151 B1 3/2001 Musgrave et al.
6,230,148 B1 5/2001 Pare, Jr. et al.
6,233,618 B1 5/2001 Shannon
6,256,737 B1 7/2001 Bianco et al.
6,260,024 B1 7/2001 Shkedy
6,268,788 B1 7/2001 Gray
6,269,348 B1 7/2001 Pare, Jr. et al.
6,275,944 B1 8/2001 Kao et al.
6,310,966 B1 10/2001 Dulude et al.
6,327,578 B1 12/2001 Linehan
6,366,682 B1 4/2002 Hoffman et al.
6,377,228 B1 4/2002 Jenkin et al.
6,397,198 B1 5/2002 Hoffman et al.
6,411,728 B1 6/2002 Lee et al.
2001/0044775 A1 11/2001 Saito et al.

FOREIGN PATENT DOCUMENTS

EP 0581421 A1 2/1994
EP 0598469 A2 5/1994
EP 0 651 357 A1 5/1995
EP 0823701 A2 2/1998
EP 0652 540 B1 9/2000
WO WO94/10659 5/1994
WO WO95/13591 5/1995

| WO | WO98/25227 | 6/1997 |
| --- | --- | --- |
| WO | WO98/50875 | 11/1998 |
| WO | WO99/28847 | 6/1999 |

OTHER PUBLICATIONS

Holmes, et al., "A Performance Evaluation of Biometric Identification Devices"; Sandia National Laboratories; Albuquerque, NM; Jun. 1991.

Anderson, T.; "Security Management"; v. 37, No. 11; Nov. 1993; pp. 17-19.

Lange, et al.; "Digital Identification: It's Now at our Fingertips", *Electronic Engineering Times*; No. 946; Mar. 24, 1997; p. 142.

Anonymous; A Credit Union Points a Finger at Biometrics; *Bank Network News*; v. 15, No. 16; Jan. 13, 1997.

Hall, J; "Scanning Lets Fingerprints Do Talking"; *Toronto Star*; PA6, May 15, 1997.

Scally, R.; "CompUSA Tests Fingerprints to Help Secure Transactions"; *Discount Store News*; v. 36, No. 10, May 19, 1997.

Stosz, et al. "Automated System for Fingerprint Authentication Using Pores and Ridge Structure"; *Proceedings of The International Society for Optical Engineering*; v. 2277; Jul. 28-29, 1994; pp. 210-223.

Recently Granted Patents in the USA—Sep. 1998; Transponder News; (5 pages).

Toll, Janie "Veridicom Showcases New Customers and Applications at COMDEX"; Press Release; Nov. 16, 1998; 3 pages.

Kolor, Joanna; "Biometric Technology Goes Live" *Bank Network News*; May 1, 1996; 7 pages.

Radcliff, D., "When Data Warehouses Become 'Open Houses': DW Vendors Reply on Internal Safeguards, Third Parties for Security-Technology Information"; Software Magazine; v. 16, No. 11; Nov. 26, 1996.

* cited by examiner

*Primary Examiner*—Harish T Dass
*Assistant Examiner*—Jennifer Liversedge
(74) *Attorney, Agent, or Firm*—Marger Johnson & McCollom, P.C.

(57) ABSTRACT

A method and device enables tokenless authorization of an electronic payment between a payor and a payee using an electronic identicator and a one payor bid biometric sample. The payor registers with a registration biometric sample, and a payor financial account identifier. The payee registers a payee identification data with the electronic identicator. A payee bid identification data and a payor bid biometric sample are electronically forwarded to the identicator. The bid biometric sample is compared with registered biometric samples and the payee's bid identification data is compared with a payee's registered identification data for a successful or failed identifications of the payor and payee. If the identicator successfully identifies the payor and payee, the identicator electronically forwards a payor financial account identifier to the payee. An electronic financial transaction is then formed comprising a transaction amount and a payor financial account identifier.

23 Claims, 8 Drawing Sheets

TOKENLESS BIOMETRIC ELECTRONIC FINANCIAL TRANSACTIONS VIA A THIRD PARTY IDENTICATOR

CROSS REFERENCE

This application is a continuation of application Ser. No. 09/731,536, filed on Dec. 6, 2000, now U.S. Pat. No. 6,950,810, which is a continuation-in-part of application Ser. No. 09/239,570, filed on Jan. 29, 1999, now U.S. Pat. No. 6,269,348, which is a continuation of application Ser. No. 08/705,399, filed on Aug. 29, 1996 now U.S. Pat. No. 5,870,723, which is a continuation-in-part of U.S. application Ser. No. 08/442,895 filed on May 17, 1995 now U.S. Pat. No. 5,613,012 which is a continuation-in-part of U.S. application Ser. No. 08/345,523, filed on Nov. 28, 1994, now U.S. Pat. No. 5,615,277, all commonly assigned, and all incorporated by reference herein.

FIELD OF THE INVENTION

This invention relates to the field of tokenless biometric financial transactions. Specifically, this invention is directed towards a system and method of using biometrics for processing electronic financial transactions such as on-line debit, off-line debit and credit transactions without requiring the user to directly use or possess any man-made tokens such as debit or credit cards or checks. For any transaction designated to be processed as an electronic credit or debit, this invention provides a user, whether an individual or a business, with the ability to pay for goods and services either at the retail point-of-sale ("POS"), at an automated teller machine ("ATM") or over the internet using only a biometric.

BACKGROUND

The use of a token, an inanimate object that confers a capability to the buyer presenting it, is pervasive in today's electronic financial world. Whether a consumer is buying groceries with a debit card or shopping in a department store with a credit card, at the heart of that transaction is a money transfer enabled by a token, which acts to identify both the consumer as well as the financial account being accessed.

Traditionally, a person must directly possess a man-made personalized token whenever attempting authorization for an electronic financial transaction. Tokens such as magnetic ink encoded paper checks, smart cards, magnetic swipe cards, identification cards or even a personal computer programmed with resident user-specific account data, are "personalized" because they are each programmed or encoded with data that is unique and personalized to the authorized user. For examples: at a retail point-of-sale, the user directly possesses and physically presents personalized credit or debit cards encoded with his unique account data to the merchant; or, over the internet, the user directly possesses and electronically presents his personal computer's resident user-unique account data to the remote merchant. By contrast, as the disclosed invention is completely tokenless, it does not require the user to directly possess, carry or remember any personalized token that can be lost, stolen or damaged.

The sole functions of such tokens are to attempt to identify both the user and the financial account being accessed to pay for the transaction. However, these tokens can be easily exchanged, either knowingly or unknowingly, between users, thereby de-coupling them from the original intended user. Because these encoded credit or debit cards, identification cards or personal computers storing resident user data are ubiquitous in today's consumer and business transactions as verification of the submitter's check writing authority, and the attendant inconveniences and security vulnerabilities of such tokens are widespread.

Credit cards can easily be turned into cash if the card falls into the wrong hands. While theft of a token constitutes the majority of fraud in the system, fraud from counterfeit credit cards is rising rapidly. Counterfeit credit cards are manufactured by a more technically sophisticated criminal who acquires a cardholder's valid account number, produces a valid-looking counterfeit card, encodes the magnetic strip, and embosses the counterfeit plastic card with the account number. The card is then repeatedly presented to merchants until the account's credit limit is reached. Another form of loss is caused by a criminal seller or his employees who surreptitiously obtains the cardholder's account number and enter fictitious transactions against the card and then take cash out of the till. It is estimated that losses due to all types of fraud exceed one billion dollars annually.

Generally, debit cards are used in conjunction with a personal identification number (PIN). However, various strategies have been used to obtain PINs from unwary cardholders. These techniques range from Trojan horse automated teller machines in shopping malls that dispense cash but record the PIN, to fraudulent seller point-of-sale devices that also record the PIN, to criminals with binoculars that watch cardholders enter PINs at ATMs. The subsequently manufactured counterfeit debit cards are then used in various ATM machines until the unlucky account is emptied.

Customer fraud, for both credit and debit cards, is also on the rise. Customers intent on this sort of fraud can claim that they lost their card, say that their PIN was written on the card, and then withdraw money from their account using card, and then refuse to be responsible for the loss.

The financial industry is well aware of the trends in fraud, and is constantly taking steps to improve the security of the card. However, the linkage between the buyer and his token is tenuous, and that is the fundamental reason behind card fraud today.

One possible solution to stolen-card fraud involves placing PIN protection for magnetic stripe credit cards, much as debit cards have PINs today. This will raise the administrative costs for each card, since cardholders will undoubtedly wish to select their own PIN for each of their 3.4 cards (the national average). In addition, this solution still doesn't address the problem of counterfeit cards.

Another solution that solves both stolen-card fraud and greatly reduces counterfeit-card fraud involves using a smart-card that includes either a biometric or a PIN. In this approach, authenticated biometrics are recorded from a user of known identity and stored for future reference on a token. In every subsequent access attempt, the user is required to physically enter the requested biometric, which is then compared to the authenticated biometric on the token to determine if the two match in order to verify user identity.

Various token-based biometric technologies have been suggested in the prior art, using smart cards, magnetic swipe cards, or paper checks in conjunction with fingerprints, hand prints, voice prints, retinal images, facial scans or handwriting samples. However, because the biometrics are generally either: a) stored in electronic and reproducible form on the token itself, whereby a significant risk of fraud still exists because the comparison and verification process is not isolated from the hardware and software directly used by the payor attempting access, or; b) used in tandem with the user directly using magnetic swipe cards, paper checks or a PC with the user's financial data stored resident therein.

Examples of this approach to system security are described in U.S. Pat. No. 4,821,118 (Lafreniere); U.S. Pat. No. 4,993,068 (Piosenka et al.); U.S. Pat No. 4,995,086 (Lilley et al.); U.S. Pat. No. 5,054,089 (Uchida et al.); U.S. Pat. No. 5,095,194 (Barbanell); U.S. Pat. No. 5,109,427 (Yang); U.S. Pat. No. 5,109,428 (Igaki et al.); U.S. Pat. No. 5,144,680 (Kobayashi et al.); U.S. Pat. No. 5,146,102 (Higuchi et al.); U.S. Pat. No. 5,180,901 (Hirainatsu); U.S. Pat. No. 5,210,588 (Lee); U.S. Pat. No. 5,210,797 (Usui et al.); U.S. Pat. No. 5,222,152 (Fishbine et al.); U.S. Pat. No. 5,230,025 (Fishbine et al.); U.S. Pat. No. 5,241,606 (Horie); U.S. Pat. No. 5,265,162 (Bush et al.); U.S. Pat. No. 5,321,242 (Heath, Jr.); U.S. Pat. No. 5,325,442 (Knapp); and U.S. Pat. No. 5,351,303 (Willmore).

Uniformly, the above patents disclose financial systems that require the user's presentation of personalized tokens to authorize each transaction, thereby teaching away from tokenless biometric financial transactions. To date, the consumer financial transaction industry has had a simple equation to balance: in order to reduce fraud, the cost and complexity of the personalized token directly possessed by the user must increase.

Also, the above patents that disclose commercial transaction systems teach away from biometric recognition without the use of tokens or PINs. Reasons cited for such teachings range from storage requirements for biometric recognition systems to significant time lapses in identification of a large number of individuals, even for the most powerful computers.

Unfortunately, any smartcard-based system will cost significantly more than the current magnetic stripe card systems currently in place. A PIN smartcard costs perhaps $3, and a biometric smartcard will cost $5. In addition, each point-of-sale station would need a smartcard reader, and if biometrics are required, a biometric scanner will also have to be attached to the reader. With 120 million cardholders and 5 million stations, the initial conversion cost is from two to five times greater than the current annual fraud losses.

This large price tag has forced the industry to look for new ways of using the power in the smartcard in addition to simple commercial transaction. It is envisioned that in addition to storing credit and debit account numbers and biometric or PIN authentication information, smart cards may also store phone numbers, frequent flyer miles, coupons obtained from stores, a transaction history, electronic cash usable at tollbooths and on public transit systems, as well as the buyer's name, vital statistics, and perhaps even medical records.

The net result of "smartening" the token is centralization of function. This looks good during design, but in actual use results in increased vulnerability for the consumer. Given the number of functions that the smartcard will be performing, the loss or damage of this monster card will be excruciatingly inconvenient for the cardholder. Being without such a card will financially incapacitate the cardholder until it is replaced. Additionally, losing a card full of electronic cash will also result in a real financial loss as well.

Thus, after spending vast sums of money, the resulting system will definitely be more secure, but will result in heavier and heavier penalties on the consumer for destruction or loss of the card.

To date, the consumer financial transaction industry has had a simple equation to balance: in order to reduce fraud, the cost of the card must increase. As a result, there has long been a need for an electronic financial transaction system that is highly fraud-resistant, practical, convenient for the consumer, and yet cost-effective to deploy.

As a result, there is a need for a new electronic financial transactions system that is highly fraud-resistant, practical, convenient for the consumer, and yet cost-effective to deploy. More specifically, there is a need for an electronic financial transaction system that relies solely on a payor's biometric for transaction authorization, and does not require the payor to directly possess any personalized man-made memory tokens such as smart cards, magnetic swipe cards, encoded paper checks or personal computers for identification.

Lastly, such a system must be affordable and flexible enough to be operatively compatible with existing networks having a variety of electronic transaction devices and system configurations. Accordingly, it is the objective of the present invention to provide a new system and method of tokenless biometric financial transactions.

There is also a need for an electronic financial transaction system that uses a strong link to the person being identified, as opposed to merely verifying a buyer's possession of any physical objects that can be freely transferred. This will result in a dramatic decrease in fraud, as only the buyer can authorize a transaction.

Accordingly, it is an objective of the present invention to provide a new system and method of tokenless biometric financial transactions for electronic credit and debit.

Another objective of the invention is to provide an electronic credit and debit financial transaction system and method that eliminates the need for a payor to directly possess any personalized man-made token which is encoded or programmed with data personal to or customized for a single authorized user. Further, it is an objective of the invention to provide an electronic financial transaction system that is capable of verifying a user's identity based on one or more unique characteristics physically personal to the user, as opposed to verifying mere possession of personalized objectives and information.

Another objective of the invention is to provide an electronic financial transaction system that is practical, convenient, and easy to use, where payors no longer need to remember personal identification numbers to access their financial accounts.

Another objective of the invention is to provide increased security in a very cost-effective manner, by completely eliminating the need for the payor to directly use ever more complicated and expensive personalized tokens.

Another objective of the invention is to provide an electronic financial transaction system that is highly resistant to fraudulent access attempts by unauthorized users.

Another objective of the invention is to authenticate the system to the payor once the electronic financial transaction is complete, so the payor can detect any attempt by criminals to steal their authentication information.

Another objective of the invention is that the payee be identified by an electronic third party identicator (ETPI), wherein the payee's identification is verified. Therefore, the payee would register with the ETPI payee identification data, which optionally comprises, a payee hardware ID code, a payee phone number, a payee email address, a payee digital certificate code, a payee financial account number, a payee biometric, or a payee biometric and PIN combination.

Still, another objective of the invention is to be added in a simple and cost-effective manner to existing terminals currently installed at points of sale and used over the Internet around the world.

Yet another objective of the invention is to be efficiently and effectively operative with existing financial transactions systems and protocols, specifically as these systems and protocols pertain to processing of electronic credit and debits.

A final objective of the invention is to make use of existing credit and debit authorization systems already present at points of sale.

SUMMARY

The invention satisfies these needs by providing a method and device for tokenless authorization of an electronic payment between a payor and a payee using an ETPI and at least one payor bid biometric sample. The method comprises a payor registration step, wherein the payor registers with an ETPI at least one registration biometric sample, and at least one payor financial account identifier. In a payee registration step, the payee registers a payee identification data with the ETPI. At least one bid biometric sample is then obtained from the payor's person in a collection step. Preferably in one transmission step the payee bid identification data and payor bid biometric sample are electronically forwarded to the third party electronic identicator. A comparator engine or the identification module of the third party identicator compares the bid biometric sample with at least one registered biometric sample for producing either a successful or failed identification of the payor. The comparator engine also compares the payee's bid identification data with registered payee identification data for producing either a successful or failed identification of the payee. Once the third party identicator successfully identifies the payor and payee, at least one payor financial account identifier is electronically forwarded to the payee. An electronic financial transaction is then formed between the payor and the payee, comprising a transaction amount and a payor financial account identifier. The transaction amount may comprise a "cash back" amount in addition to the purchase amount. This financial transaction is electronically forwarded to a financial transaction processor for authorization. Thus, upon successful identification of the payor and payee, and upon successful authorization of the financial transaction by the financial transaction processor, a biometric-based authorization of an electronic payment is made without requiring the payor to present any personalized man-made tokens such as magnetic swipe cards or smartcards to transfer funds from the payor's financial credit/debit account to the payee's financial account.

The payee identification data comprises any one of the following: a payee hardware ID code, a payee telephone number, a payee email address, a payee digital certificate code, a payee account index, a payee financial account number, a payee biometric, and a payee biometric and PIN combination.

Optionally, in a payor account selection step, after the payor has been successfully identified in the payor identification step, the ETPI presents at least one identifier for a financial account which was registered by the payor with the ETPI for selection by the payor of one of the financial accounts for debiting.

The present invention is significantly advantageous over the prior art in a number of ways. First, it is extremely easy and efficient for people to use because it eliminates the need to directly possess any personalized tokens in order to access their authorized electronic financial accounts.

The present invention eliminates all the inconveniences associated with carrying, safeguarding, and locating such tokens. It thereby significantly reduces the amount of memorization and diligence traditionally and increasingly required of people by providing protection and access to all financial accounts using only a biometric. The buyer is now uniquely empowered, by means of this invention, to conduct his personal and/or professional electronic transactions at any time without dependence upon tokens, which may be stolen, lost or damaged.

The invention is convenient to sellers and financial institutions by making electronic credit and debit purchases and other financial transactions less cumbersome and more spontaneous. The paperwork of financial transactions is significantly reduced as compared to standard credit and debit transactions wherein the copies of the signed receipt must often be retained by the seller, financial institutions and the buyer.

Overall, because the method and system of this invention are designed to provide a person with simultaneous direct access to all or any number of his financial accounts, the need for transactions involving credit cards, debit cards, paper money, credit drafts and the like can be greatly reduced, thereby reducing the cost of equipment and staff required to collect, account, and process such transactions.

Further, the present invention will mitigate the substantial manufacturing and distributing costs of issuing and reissuing personalized tokens such as magnetic swipe cards and smart cards, thereby providing further economic savings to issuing banks, businesses, and ultimately to consumers.

Moreover, the invention is markedly advantageous and superior to existing systems in being highly fraud resistant. As discussed above, present authorization systems are inherently unreliable because they base determination of a user's identity on the physical presentation of a manufactured personalized token along with, in some cases, information that the user knows. Unfortunately, both the token and information can be transferred to another person through loss, theft or by voluntary action of the authorized user.

Thus, unless the loss or unintended transfer of these items is realized and reported by the authorized user, anyone possessing such items can be recognized by existing authorization systems as the buyer to whom that token and its corresponding financial accounts are assigned. Even appending the need for presentation of a biometric in conjunction with such personalized tokens is severely flawed, since if the authorized buyer is unable to present the requisite token at the time of transaction, he will be unable to access his financial accounts. As such, these complex arrangements are ineffective, since the security they intend to provide can easily block an authorized user from using his own rightful financial resources by virtue of his personalized token having been lost, stolen or damaged.

By contrast, the present invention virtually eliminates the risk of denying access to rightful users while simultaneously protecting against granting access to unauthorized users. By determining identity and transaction authorization solely from an analysis of a user's unique biometric characteristics, this invention creates a highly secure system that maintains optimal convenience for both buyers and sellers to transaction their electronic business anytime, anywhere.

Additionally, the invention leverages the existing financial transaction processing networks and business relationships already existing at point-of-sale for many merchants. In this way, the invention is easy to integrate with a merchant's existing operations.

These and other advantages of the invention will become more fully apparent when the following detailed description of the invention is read in conjunction with the accompanying drawings.

DETAILED DESCRIPTION

The invention provides a cardless biometric method for authorizing electronic payments using credit and debit accounts either at the retail point-of-sale or over the Internet. It is the essence of this invention that the payor not be required to directly use any man-made personalized token in order to effect the transaction. A computer system is used to accomplish these goals.

A credit account is defined as an account that allows authorization and settlement of electronic payments as issued by such entities as VISA, MasterCard, Discover, American Express, or an in-house credit account issued by a retailer such as Macy's. Issuers of credit accounts lend money to payors, often charge interchange fees to payees, and are responsible for approving or denying transactions. Off-line debit accounts are also defined as credit accounts even though the funds are deposited by a payor instead of a line of credit from an issuer.

A debit account is defined as an account that holds money deposited by a payor available for immediate debit in real time, also known in the industry as on-line debit. These are often checking accounts. On-line debit transactions require a PIN for identification of the payor.

A stored value account is an account in which a consumer can deposit money for later withdrawal, often via an electronic payment system of some sort.

A financial account is a credit account, debit account, stored value account, or any other type of financial account from which funds may be drawn. A financial account identifier is any mechanism that can be used to uniquely identify a financial account. Typical examples of financial account identifiers include checking account numbers, savings account numbers, credit card numbers, debit card numbers and stored value card or account numbers.

A financial account identifier can also be the data stored on track 1 or 2 of a standard magnetic stripe credit card or the American Bankers Association routing code and account number stored in magnetic ink at the bottom of a paper check.

A financial transaction processor is an entity that authorizes and/or settles electronic financial transactions. FTPs are often called "acquirors" or "processors" in the industry. Examples include First Data®, efunds®, Vital Processing Services® and many others.

The tokenless authorization system or the third party identicator comprises the following components:

Party Identification Apparatus (PIA)

Communication lines

Data Processing Center (DPC)

These components together allow a payor to originate an electronic payment without requiring the payor to carry driver's licenses, credit cards, check guarantee cards, or other forms of identity.

Party Identification Apparatus (PIA)

Figure 1:
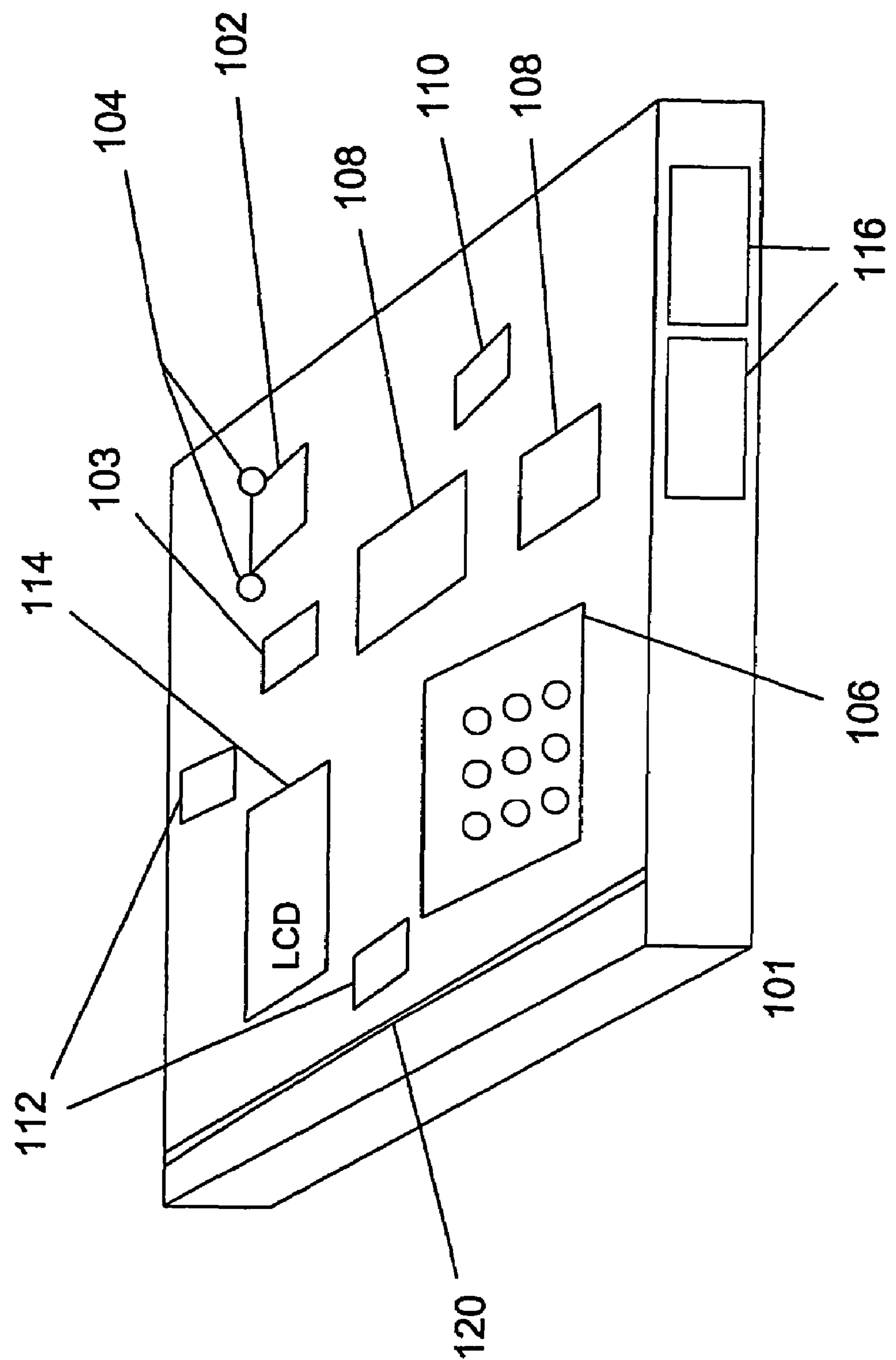
FIG. 1 is a schematic diagram of the preferred embodiment of a Party Identification Apparatus (PIA) with a biometric sensor and key pad.

The PIA 101 is a device that gathers identity information for use in authorizing electronic payments. Each PIA conducts one or more of the following operations:

- gather biometric input from a payor or payee
- gather a PIN code or password from a payor or payee
- secure communication between PIA and DPC using encryption
- secure storage of secret encryption keys
- store and retrieve a unique payee PIA hardware identification code
- secure enclosure & components from unauthorized tampering
- display information, allow parties to approve or cancel an electronic payment
- scan a magnetic stripe card
- store, verify, and retrieve a payee digital identification code
- allow parties to select among choices of payor financial accounts A preferred embodiment containing these components is shown in FIG. 1.

Biometric input is gathered using a biometric sensor 102 located within the PIA 101 operating under control of a microprocessor 103. Biometric sensor 102 is a finger image sensor, however it is understood that other types of biometric sensors such as iris scan and others are also used.

For PIAs requiring a fingerprint sensor 102, the PIA preferably has a biometric fraud detection unit that will assure that any biometric input gathered from the biometric sensor is from a real physical person, instead of a copy or replica. Preferably for the finger image sensor, this is a blood flow detector 104. Other types of biometric sensors can be used, such as a fingerprint, facial scan, retinal image, iris scan or voice print. For example, a voice sensor can be used in a telephone sales system.

For systems employing a PIN, PIN input is preferably gathered using a keypad or PIN pad 106 that is also located securely inside the PIA and coupled to the microprocessor 103.

Communication security is provided by encryption using unique secret keys known only to that specific PIA and the DPC, and the DES encryption algorithm, preferably triple-encrypted. Triple encryption means successive encrypt/decrypt/encrypt operations using two distinct 56-bit DES keys. This provides significantly higher security than a single encryption operation with one 56-bit DES key. Alternately, a public/private key system may also be used to encrypt information that passes between PIA and DPC. Both DES and public key encryption are well known in the industry.

The PIA also has secure memory 108 that can store and retrieve the unique secret encryption keys used to enable secure communications with the DPC. In this embodiment, this memory is battery backed-up RAM that is set up to be erased whenever tamper-detect circuitry 112 coupled to the microprocessor reports that tampering has been detected.

To use encryption keys, a key management system must be employed to assure that both sender and receiver are using the same key. When using DES, a preferred key management system is DUKPT, which is well known in the industry. DUKPT is designed to provide a different DES key for each transaction, without leaving behind the trace of the initial secret key. The implications of this provision are that even successful capture and dissection of a PIA will not reveal messages that have previously been sent, a very important goal when the effective lifetime of the information transmitted is years. DUKPT is fully specified in ANSI X9.24. The DUKPT key table is stored in the secure memory 108.

Each PIA preferably has a hardware identification code that is registered with the DPC at the time of manufacture. This makes the PIA uniquely identifiable to the DPC in all transmissions from that device. This hardware identification code is stored in write-once or read-only memory 110.

PIA physical security is assured by standard mechanisms. Preferably, these comprise tamper-detect circuitry 112, an enclosure that cannot be easily opened without visibly injuring the enclosure, erasable memory for critical secrets such as encryption keys, write-once or read-only memory for hardware identification, tight integration of all components, and "potting" of exposed circuitry.

Information such as the amount of a transaction, the identity of a payee, the list of credit/debit accounts for a payor to select from, or other transaction-related information is displayed using an integrated LCD screen 114. It is preferable that the LCD screen be connected securely to the other components in the PIA to maintain security.

Approval or cancellation of an electronic payment is done using the PIA keypad 106.

The magnetic stripe reader 120 is used to read the account information that is encoded on the magnetic stripe of a credit or debit card. This reader is used during initial registration to link a payor's financial account information to the biometric identity.

Optionally, the PIA also validates public key digital certificates. In one embodiment, public keys of a particular certifying authority are initially stored in the PIA at the time of construction. This capability provides the mechanism to verify a payee's digital certificates that are signed by the certifying authority.

The PIA also optionally displays a list of payor financial accounts on the LCD screen and provides for selection of accounts using the keypad. Specific logos provided by each card issuer are preferably displayed in place of the account number, so that the payor can select which financial account the electronic payment will come from using the keypad, without disclosing the account number. In another embodiment, the PIA can simply display a list of financial account types (e.g., credit, debit, stored value) and the consumer can select the type of account to use in the transaction.

The PIA preferably has a serial port or ethernet port 116 used for communication with the DPC. When ethernet is used, the PIA is connected to an existing local area network already present with a merchant's store, or a separate local area network used only for PIAs can be used. Where the serial port is used, the PIA is connected to existing point-of-sale equipment or an electronic cash register at the merchant's store. This equipment or cash register can then communicate with the DPC.

Note that not all PIAs have displays, keypads or card readers. In an embodiment that is preferable for some merchant locations, the PIA consists only of a fingerprint or other biometric sensor, a microprocessor, memory, a serial port, and an ethernet port. The serial port is used to attach the PIA to existing point-of-sale equipment (e.g., a Verifone Everest Plus or Checkmate CM2001) or electronic cash registers. The ethernet port is used to communicate with the DPC via the merchant's existing in-store local area network. This embodiment makes use of the display and keypad on the existing POS equipment, thus eliminating the need to have a display and keypad on the PIA.

Although a preferred embodiment is described above, there are many different variations on specific PIA implementations. Fundamentally any device that is secure, can identify a person or entity with a high degree of certainty, and can connect to the DPC via some form of communication line can serve as a PIA.

In some embodiments, specifically the home use and public use instances, the PIA hardware identification code is not used to identify either the payor or the payee.

Communication Lines

Communications between the PIA and the DPC can occur via many different communication methods. Most depend on the particular communication networks already deployed by the organization or retailer that deploys the transaction authorization system.

Figure 2:
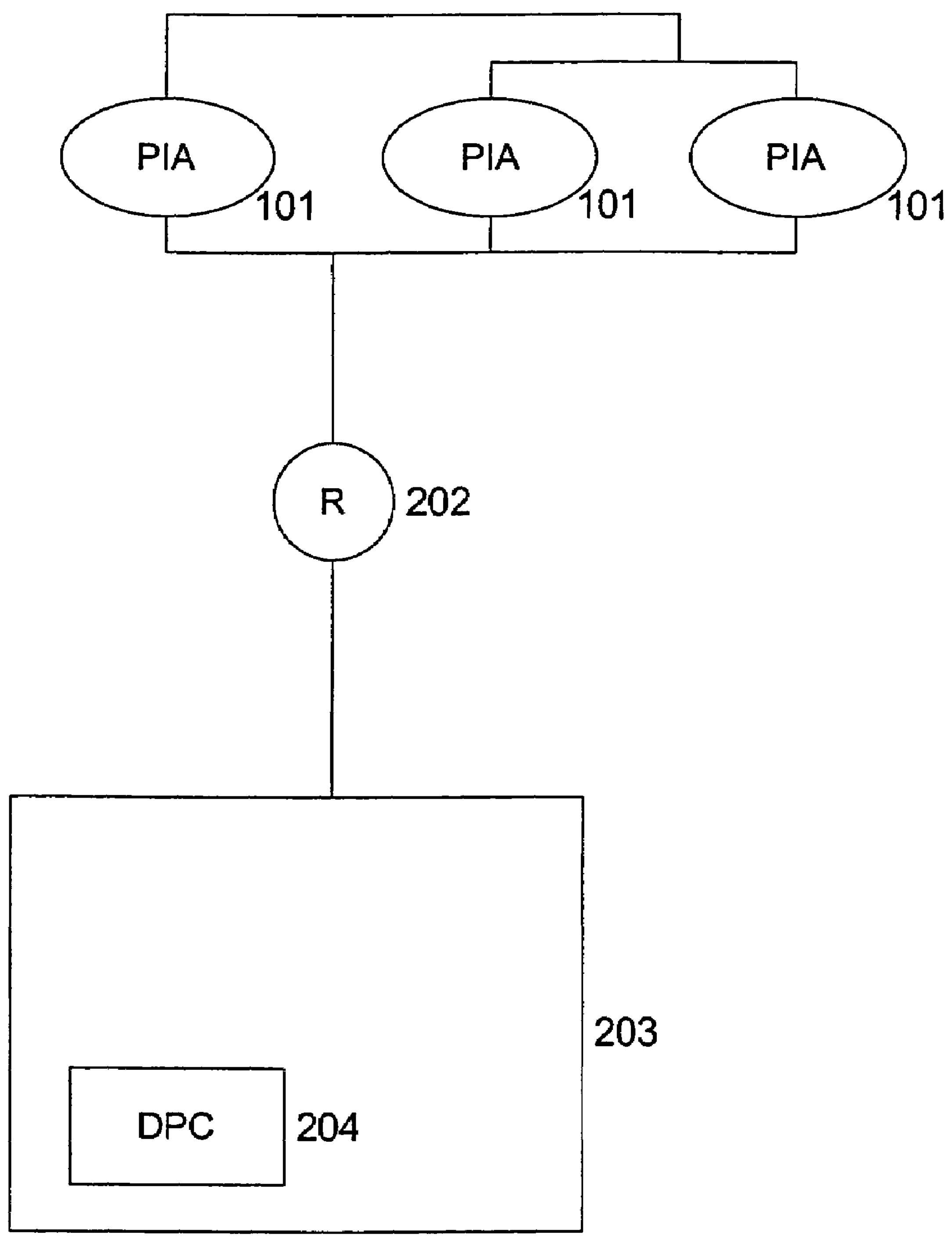
FIG. 2 is a block diagram that shows the connection between the PIAs to a local router and a network operations center according to the invention.

In an embodiment shown in FIG. 2, typical of use of the invention at a supermarket chain or other multi-lane retail chain, multiple PIAs 101 are connected via an in-store Ethernet or other local area network to a local router 202, which is itself connected to a network operations center (NOC) 203 via frame relay lines. In the illustrated embodiment, at least one DPC 204 is located at the NOC. In other embodiments, the DPC is located elsewhere, and connected to the NOC via leased lines. Messages are sent from PIA to the DPC using UDP/IP or TCP/IP over this network.

Figure 3:
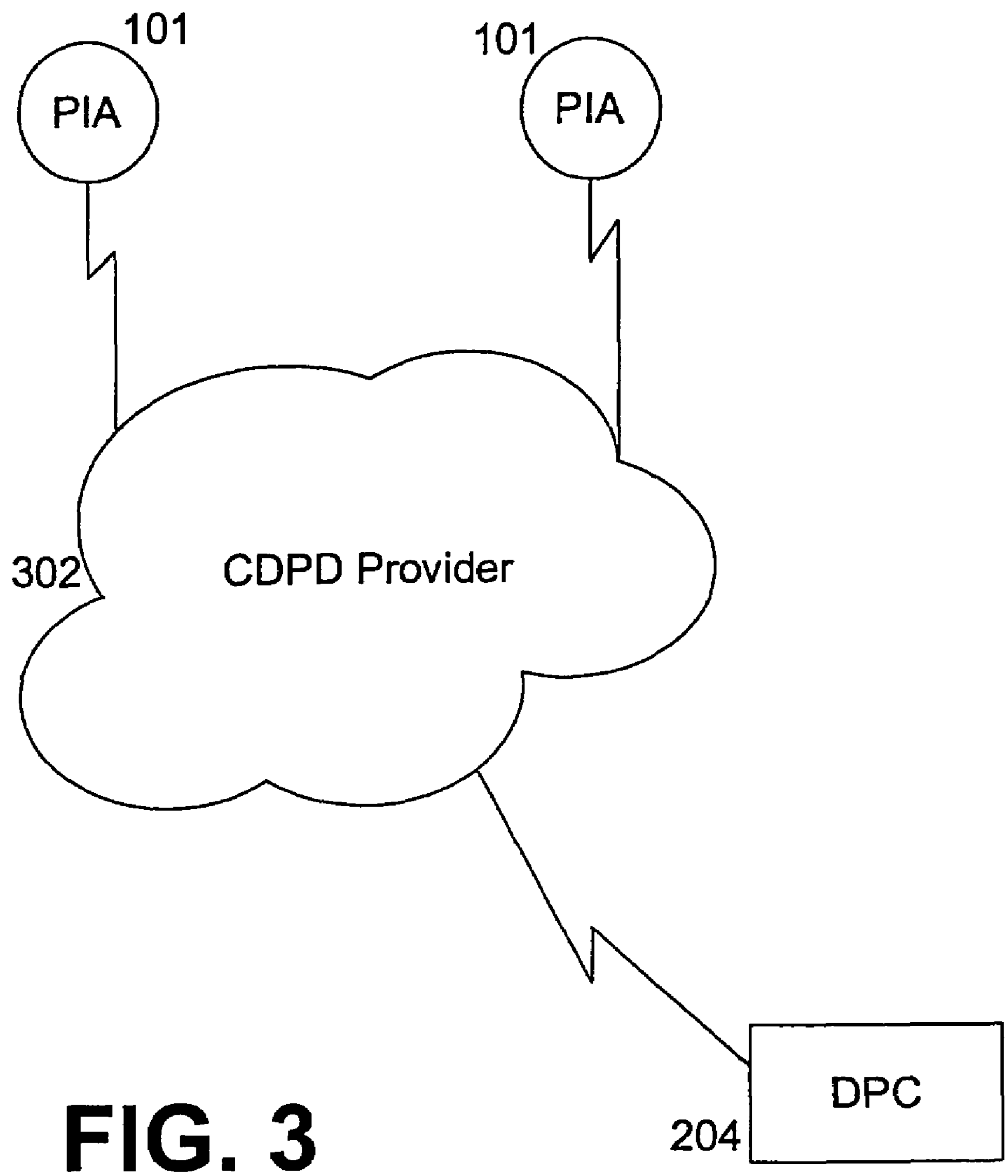
FIG. 3 shows an alternative embodiment where the PIAs are connected to the Data Processing Center (DPC) using a cellular digital packet data.

In another embodiment shown in FIG. 3, the PIAs 101 are connected via a cellular digital packet data (CDPD) modem to a CDPD provider 302, who provides IP connectivity from the PIA to an intranet to which at least one DPC 204 is coupled.

In yet another embodiment, a PIA is connected via the Internet, as is at least one DPC. TCP/IP or UDP/IP is used to transmit messages from PIA to DPC. There are many different ways to connect PIA to DPC that are well understood in the art.

Data Processing Center

Data Processing Centers (DPC) 204 serve to identify the payor and the payee in a transaction, to retrieve the payor's financial account information, and to forward the financial account information to the payee such that the payee can be paid.

Figure 4:
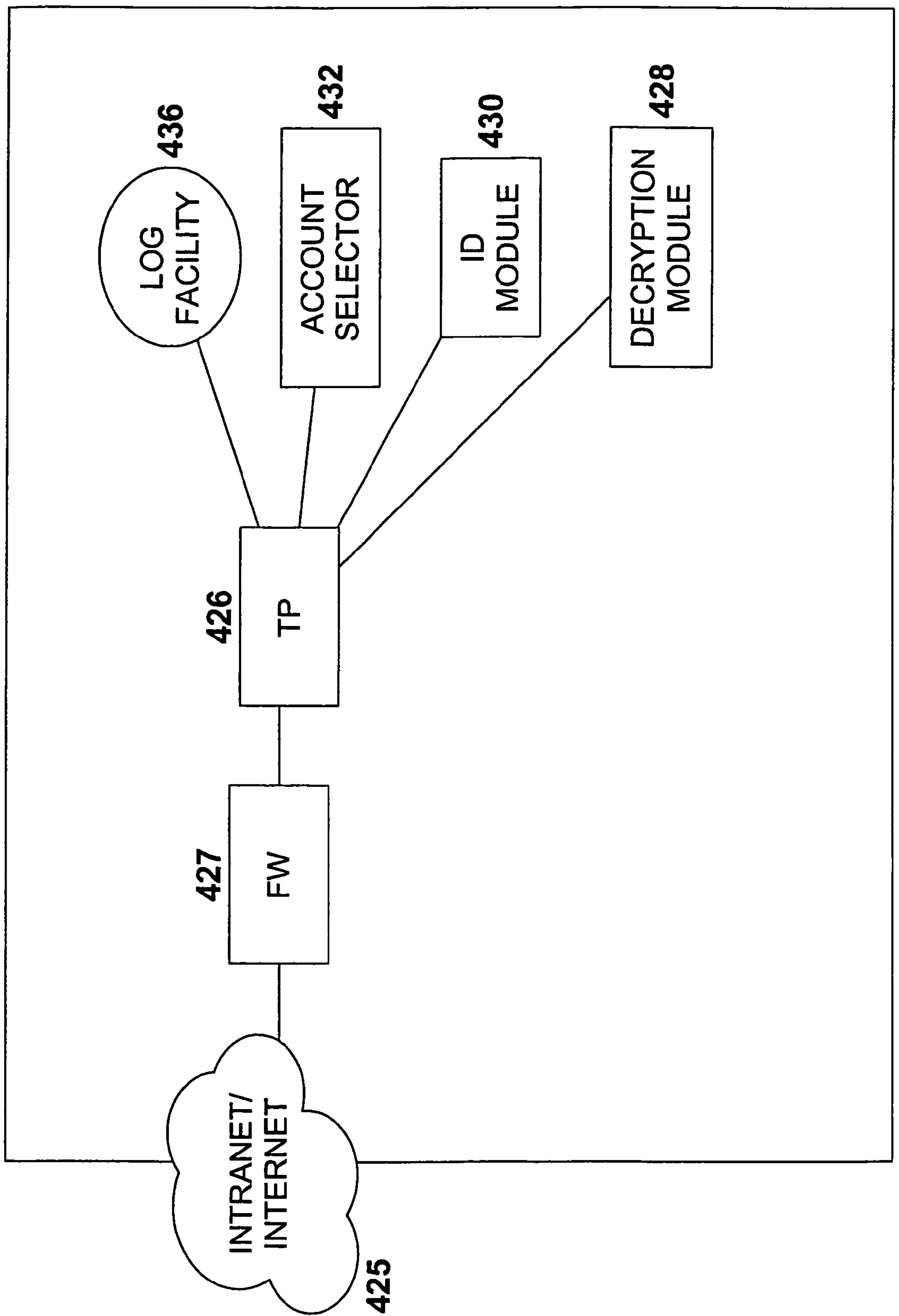
FIG. 4 is a block diagram of a preferred embodiment of the Data Processing Center (DPC) according to the present invention, showing the connections between its components.

As seen in FIG. 4, the DPC 204 is connected to the Internet or intranet 425 using a firewall machine 427 that filters out all messages that are not from legitimate PIA devices 101. Messages are then sent to a transaction processor (TP) 426, which is responsible for overseeing the steps required to process the entire transaction.

In a preferred embodiment, the messages are encrypted before being sent, and decrypted when they reach the DPC. For this, the transaction processor uses the decryption module (DM) 428, which utilizes the hardware identification code of the PIA to identify the encryption codes that is required to decrypt the message from the PIA.

Once decrypted, the identities of both parties to the transaction are determined using the identification module (IM), or comparator engine 430. Once identified, the TP 426 retrieves the payor's financial account identifiers. The TP then sends this information back to the originating PIA 101. If the payor has registered multiple financial accounts, a list of these accounts is displayed so that the payor can select the account he or she wishes to use. The PIA then forwards information about the selected account (e.g., account number, expiration date, or track 1/track 2 data) to the payee for payment. In the case of a supermarket or other multi-lane retailer, this forwarding procedure comprises transmitting the account information to existing point-of-sale systems, e.g., a Verifone point-of-sale terminal. The point-of-sale terminal then forwards this information to an electronic cash register, which in turn forwards it to an in-store controller. This can be done without displaying the payor's account information (especially account number) to store clerks. In any case, the store's existing payment systems handle the actual authorization and settlement of the transaction, just as if the payee had physically swiped a card at a point-of-sale.

Each identification attempt (successful or not) is logged in the logging facility (LF) 436.

In a preferred embodiment, more than one DPC provides fault tolerance from either natural or man-made disasters. In this embodiment, each DPC uses a backup power generator, redundant hardware, mirrored databases, and other standard fault tolerant equipment known in the industry.

Decryption Module (DM)

In a preferred embodiment, all messages the DPC 204 receives, with the exception of those not constructed by a PIA 101, contain a PIA hardware identification code, a sequence number, and a Message Authentication Code (MAC). (Message authentication codes, also known as cryptographic checksums, well known in the transaction industry, are used to assure that any changes to the content of the message will be detectable by the entity receiving the transmission.). The DM 428 validates the message's MAC and then checks the sequence number for that particular PIA. If the DM determines that both the MAC and the sequence number are valid, the DM uses the unique secret key for that particular PIA to decrypt the message. For the decryption to function properly, the DM must contain a copy of each PIA's DUKPT key table.

If the decryption operation fails, or if the MAC check fails, the message is considered an invalid message. The TP logs a warning to the LF, terminates processing for the message, and returns an error message to the originating PIA.

Each message that TP 426 receives preferably contains a response key stored in the encrypted section of the message. Before the TP replies to a message that includes a response key, it instructs the DM to encrypt the response message with that response key. The DM also generates a MAC for the response and appends it to the message.

Preferably, error messages are not encrypted, although the DM can include a MAC for message authentication. Such messages never include confidential information. However, most response messages include a status or response codes that can indicate whether the request succeeded or not.

Identification Module (IM)

Party identification occurs in different ways, depending on the identification information that is provided by the PIA. The identification module 430 has subsystems for each type of information that is provided, and each subsystem is highly optimized to provide rapid identification as outlined below.

In one embodiment, the ID module 430 detects payors or payees that re-register with the system by conducting a re-registration check. Given a particular registration biometric sample submitted by a person attempting to register with the system, the ID module determines if that person has ever been registered previously by comparing the registration biometric sample with other biometric samples previously registered. If a match occurs, the registration is rejected.

In a preferred embodiment, identification module 430 comprises subsystems that can identify parties from the following information:

- biometric data and PIN
- biometric data alone
- digital identification (digital certificates)
- PIA hardware identification code The content of the message is parsed to determine which subsystem is used.

Biometric-PIN Identification Subsystem (BPID)

In a preferred embodiment, the BPID subsystem 504 comprises at least two BPID processors 506, 508, 510, each of which is capable of identifying parties from their biometric and PIN codes. In this embodiment, a non-unique PIN and a biometric sample are preferably employed for each user.

Preferably, the database of parties identifiable from biometric-PIN combinations is distributed equally across all BPID processors. Each processor is then responsible for a subset of identifications.

Figure 5:
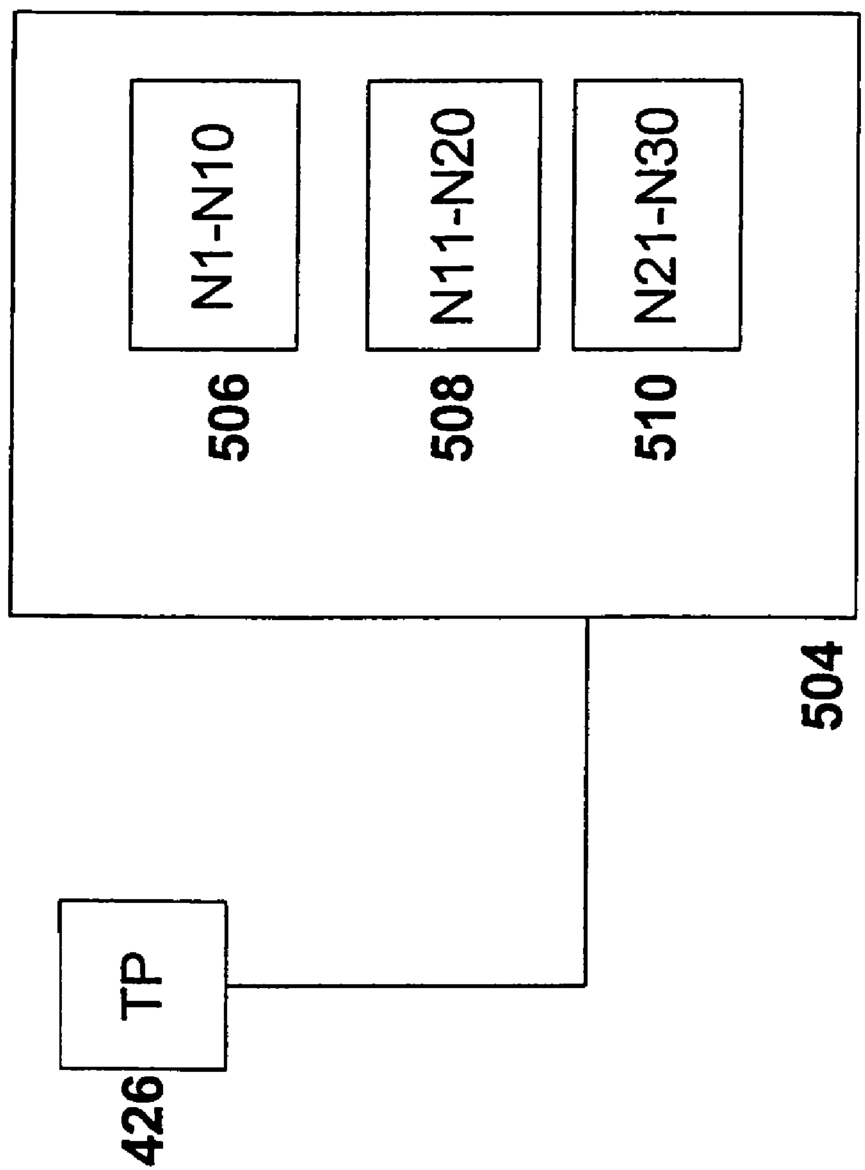
FIG. 5 is a block diagram which shows a method by which the transaction processor determines a Biometric-PIN from the Biometric-PIN Identification subsystem is responsible for a given subdivision of the biometric database.

In FIG. 5, TP 426 determines which biometric-PIN from the BPID subsystem 504 is responsible for a given subdivision of the biometric database. In one embodiment, one BPID processor 506 is responsible for identifying people with PINs N1-N10, another BPID processor 508 is responsible for identifying PINs N11-N20, and a third BPID processor 510 is responsible for identifying PINs N21-N30. For example, all messages from the PIA containing a PIN that equals the number 30 would be routed to BPID processor 510 for identification of the payor.

Once a BPID processor receives a bid biometric sample and PIN for identification, the processor searches through its database, retrieving all registered biometric samples that match or correspond to that particular bid PIN. Once all corresponding registered biometric samples are retrieved, the processor compares the bid biometric from the message to all retrieved registered biometric samples. If a match is found, the processor transmits the identity of the party back to TP 426. If no match is found, the processor transmits a "party not identified" message back to the TP.

Biometric Identification Subsystem (BID)

In another embodiment, the BID subsystem comprises at least two BID processors, each of which is capable of identifying parties only from their biometric sample.

In one embodiment, each BID processor contains the entire database of biometrics. To distribute the transactions evenly across processors without undue effort, the TP determines randomly which BID processor will be used for a given identification request, and delegates the identification request to that BID processor.

That BID processor then performs a search of its biometric sample database in order to find a matching registered biometric sample.

In one embodiment, other information is present that assists the BID processor in searching the database. For finger images, this includes information such as the classification of the image (whorl, arch, etc.), and other information about the finger ridge structure that is useful for selecting out biometrics that are not likely to match (or information on biometrics that are likely to match). Various methods of classification for rapid search of particular biometric databases are known in the art for example with regard to facial imaging and iris recognition.

Biometric comparisons are often more accurate if multiple biometrics are used. In some embodiments, multiple biometrics are used to identify individuals more rapidly and more accurately.

Digital Identification Subsystem (DID)

In a preferred embodiment, the digital identification subsystem comprises multiple processors, each of which is capable of identifying a payee from their digital certificates. In this embodiment, digital certificates are used to perform digital identification of the payee. Preferably this includes corporate web site addresses and certifying authorities only. Where possible, people provide biometrics as a means of identification, while computers provide digital certificates.

A digital certificate uniquely identifies a party. The major difficulty is verifying that a particular digital certificate is valid. This requires a public key from the certifying authority that issued that particular digital certificate. This requires that the digital identification subsystem have a list of certifying authorities and the public keys used to validate the digital certificates they issue. This table must be secure, and the keys stored therein must be kept up to date. These processes and others relating to the actual process for validating digital certificates are well understood in the industry.

PIA Hardware Identification Subsystem (PHI)

In a preferred embodiment, PIA hardware identification codes are translated into payee identification by the PHI subsystem. This subsystem maintains a list of all PIAs ever manufactured. Preferably, when a particular payee, e.g., a merchant, purchases a PIA, that payee's identity is linked to that PIA. Any transactions that originate from that PIA are assumed to be destined for the party that purchased the PIA.

Account Selector Subsystem (AS)

Referring to the AS 432 in FIG. 4, the account selection process varies depending on the party being identified. Where the payor has registered only one financial account, that account number is automatically selected by the AS for forwarding to the payee.

In the cases where a payor has registered several financial accounts, the AS processor retrieves a list of all designated financial account identifiers and transmits them back to the PIA for selection by the payor.

In one embodiment, a PIA or POS terminal allows the payor to pre-select which of multiple accounts should be used by pressing a "credit," "debit," "checking," or "stored value" key on the PIA or POS terminal before attempting to be identified. In this embodiment, the PIA notes in its identification request that only the specified account should be retrieved.

In another embodiment, loyalty or reward information is also stored in the database at the DPC. In this embodiment, such loyalty or reward information is automatically transmitted back to the PIA along with any financial account information. In the case of a PIA installed at a supermarket or other multi-lane retailer, the PIA forwards this information to existing POS or electronic cash register systems installed at the store. This procedure enables a consumer to enjoy the use of loyalty or rewards programs without needing to possess a store rewards card or other token.

Logging Facility

Each transaction (successful or not) is logged in the LOG facility (LF) 436.

In a preferred embodiment, the LOG facility (LF) 436 logs all electronic payment attempts to write-once media, so that a record is kept of each transaction and each error that has occurred during the operation of the tokenless authorization system.

Use-Sensitive DPC Configuration

While each DPC has some or all of the above features, in some embodiments the system has use-sensitive data processing capabilities, wherein multiple DPCs exist, some of which store a subset of the total number of registered parties.

This system comprises at least one master DPC, which contains a large subset of all parties registered with the system. The system further comprises at least two local DPCs that are physically apart from each other. Each local DPC contains a subset of the parties contained within the master DPC. Data communications lines allow messages to flow between each local DPC and the master DPC.

In this embodiment, identification request messages are first sent to the local DPC for processing. If a party cannot be identified by the local DPC, the message is forwarded to the master DPC. If the parties are identified properly by the master DPC, the message is processed appropriately. In addition, one or both party's identity information is transmitted from the master DPC to the local DPC, so that the next time the parties will be successfully identified by the local DPC.

In another embodiment of a use-sensitive DPC system, the system further comprises a purge engine for deleting a party's identification information from the local DPC databases. In order to store only records for those parties who use the system with more than a prescribed frequency and to prevent the overload of databases with records from parties who use the system only occasionally, the record of a party is deleted from the local DPC databases if there has been no attempt to identify the party upon expiration of a predetermined time limit.

In order to make communications between the master DPC and the local DPCs secure, the system further comprises encryption and decryption means, wherein communications between the master DPC and local DPC are encrypted.

Registration

Parties wishing to either originate or receive electronic payments must first register with the ETPI. The identification and financial information registered with the system for a given party depends on the mode used to originate or receive payment. A payor must register at least one biometric or a biometric-PIN. Corporate entities must register at least one digital certificate, or must register their PIA hardware identification codes. The payor must also register the appropriate financial account information, e.g., credit/debit account information or checking account information.

To register, a payor submits a registration biometric sample obtained from their physical person by the PIA's biometric sensor. The PIA preferably determines that the biometric scan is non-fraudulent, and then translates and compresses that biometric scan into a format suitable for rapid transmission to the DPC. The payor then preferably enters a PIN code into the PIA keypad.

Next, the person associates at least one financial account identifier with the registration biometric sample in the system. Preferably, in the case of a credit or debit card, this association is accomplished by scanning a magnetic stripe card provided by the person through a magnetic stripe card reader attached to the PIA or point-of-sale terminal.

Preferably, an attendant verifies that the person actually owns the financial account by comparing personal photo ID (a driver's license, passport, ID card, etc.) to the name listed on the registration of the financial instrument (e.g., credit/debit card).

Once the attendant verifies the registration data and payor's identity, the PIA transmits the registration data to the DPC. The DPC then inserts the biometric (or biometric-PIN) into the appropriate identification database, updates the account selector, and enables the person to originate electronic payments.

In one embodiment, the DPC validates the financial account data submitted during registration. This involves making certain that the financial account being registered is a valid account.

An entity may either register at least one digital certificate, or use at least one PIA hardware identification code to identify itself to the DPC. Digital certificates are available from certifying authorities, and they provide the assurance that the entity with the certificate is the authentic owner of that identity. These certificates contain readable text and other information that describes the entity. This can include a corporate logo, the address, as well as the company name.

This digital certificate is then linked to at least one financial account. This financial account is used to deposit all electronic payments originated by the payor to the payee when the digital certificate is used to identify the receiving party.

The financial account identifier of the entity can be included in the digital certificate, but this is not a preferred embodiment, as the disclosure of the financial account is potentially injurious to the entity.

PIA hardware identification codes are unique numbers assigned to PIA devices at the time of manufacture.

Preferably, the security surrounding the registration of entity digital certificates or PIA hardware identification codes to financial account numbers is extremely strong, as this is a potential source of large losses over a short period of time.

Transactions

Transactions optionally occur at a retail point-of-sale, across the network from a well-known network merchant, or at a home or public terminal from one person to another.

Retail Point-of-Sale Transactions

Figure 6:
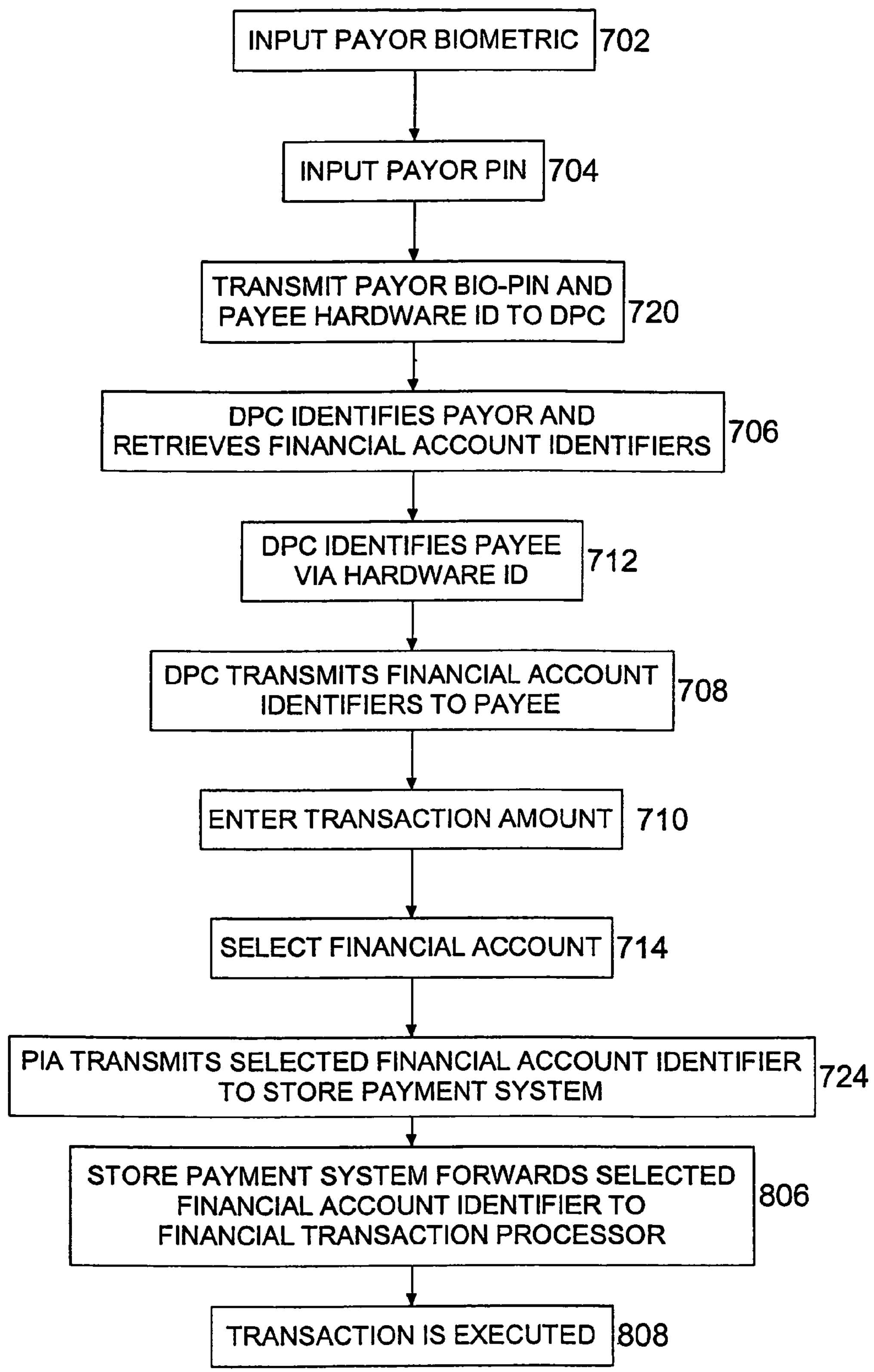
FIG. 6 is a flowchart which shows the overall preferred process according to the invention where a biometric sample and PIN are used by the tokenless system to authorize an automated clearing house (ACH) transaction.
Figure 7:
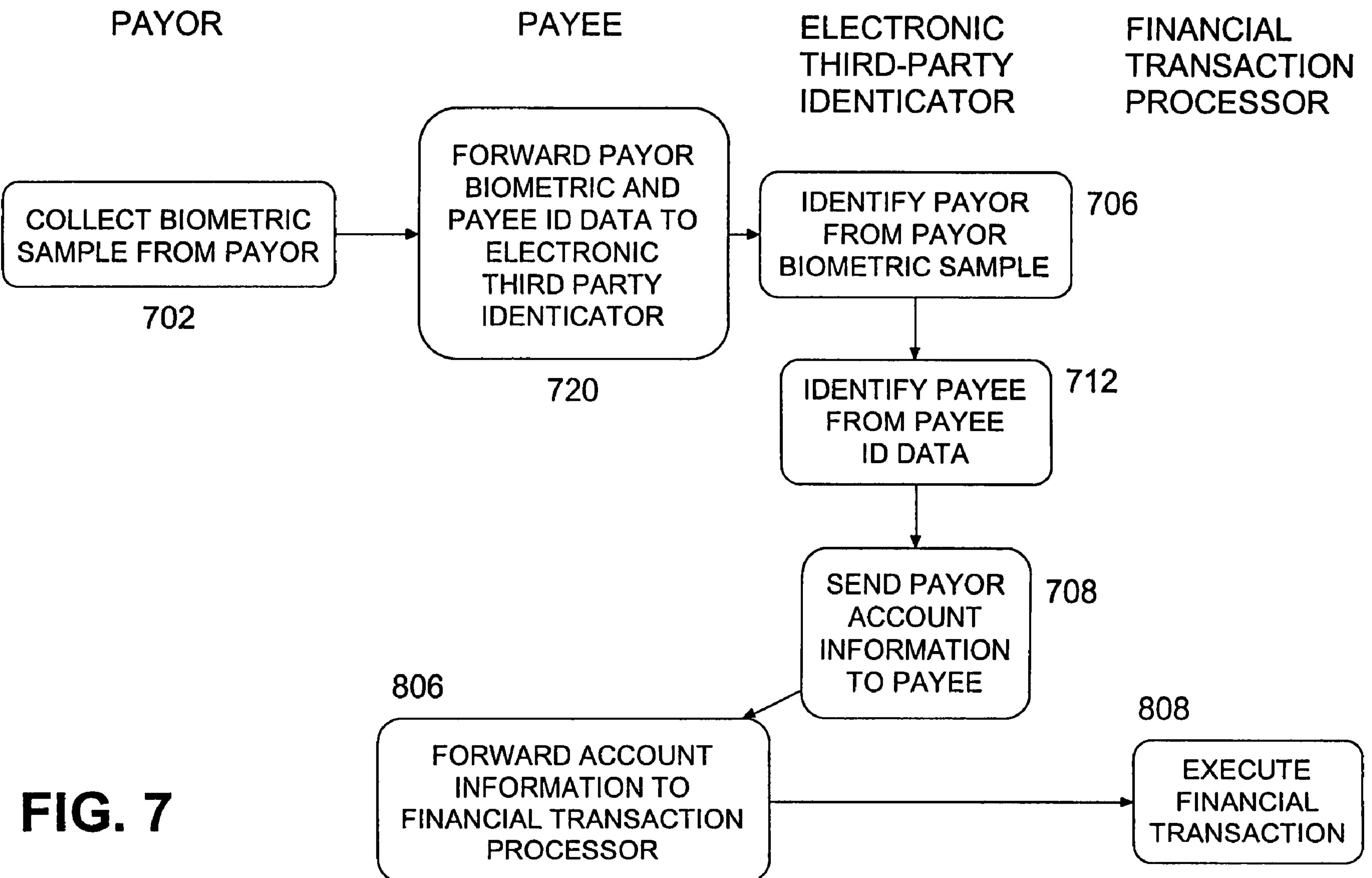
FIG. 7 is a diagram of the preferred transaction flow according to the invention in a retail point-of-sale transaction.

A typical retail point-of-sale (POS) transaction, specifically a tokenless biometric electronic financial transaction via a third party identicator, is shown in FIG. 6. The transaction flow between each participant in the transaction is shown in FIG. 7. Such transactions are characterized by identifying the payor using their biometric sample or biometric sample-PIN input on a PIA controlled by payee. The payor is thus identified through biometrics, while the payee is identified through the PIA's hardware identification code. The payee and seller ID are then transmitted to the TP to authorize the transaction.

In a preferred embodiment shown in FIG. 6, a customer (payor) at the point-of-sale originates an electronic payment in the following manner. First, in step 702, the payor submits a bid biometric sample obtained from their physical person by the PIA's biometric sensor. The PIA determines that the biometric sample is non-fraudulent, and then translates and compresses that biometric sample into a format suitable for rapid transmission to the DPC.

Next, the payor enters a PIN code into the PIA keypad (step 704). At this point, the PIA transmits the biometric-PIN to the DPC for identification, along with the PIA hardware identification code (step 720). The DPC identifies the payor using the biometric sample (step 706), and retrieves the list of financial accounts that the payor has previously registered with the system, and transmits this list back to the PIA (step 708). The transaction amount is entered at this time (step 710), if not entered when the PIN is entered. The DPC identifies the payee using the PIA hardware identification code that was previously registered by the payee (step 712).

The PIA displays the list of financial accounts to the payor, who then selects one of the financial accounts from which the funds will be drawn. In the event that only one financial account was registered, that account is automatically selected by the tokenless authorization system (step 714).

The PIA then transmits the information (e.g., account number and expiration date, or track 1/track 2 information) associated with the selected account to the payee's in-store payment system (step 724). This in-store system, shown in FIG. 8, typically consists of a point-of-sale terminal 902, an electronic cash register 904, and associated back-office equipment, such as an in-store processor 906. The in-store system then uses this financial account information to authorize the financial transaction just as if the payor had manually swiped a credit or debit card through a card reader attached to the in-store system. This authorization generally involves forwarding the financial transaction information (transaction amount and account number) (step 806) to a financial transaction processor for execution (step 808, FIG. 8). Examples of such processors included First Data, NPC, and others.

Figure 8:
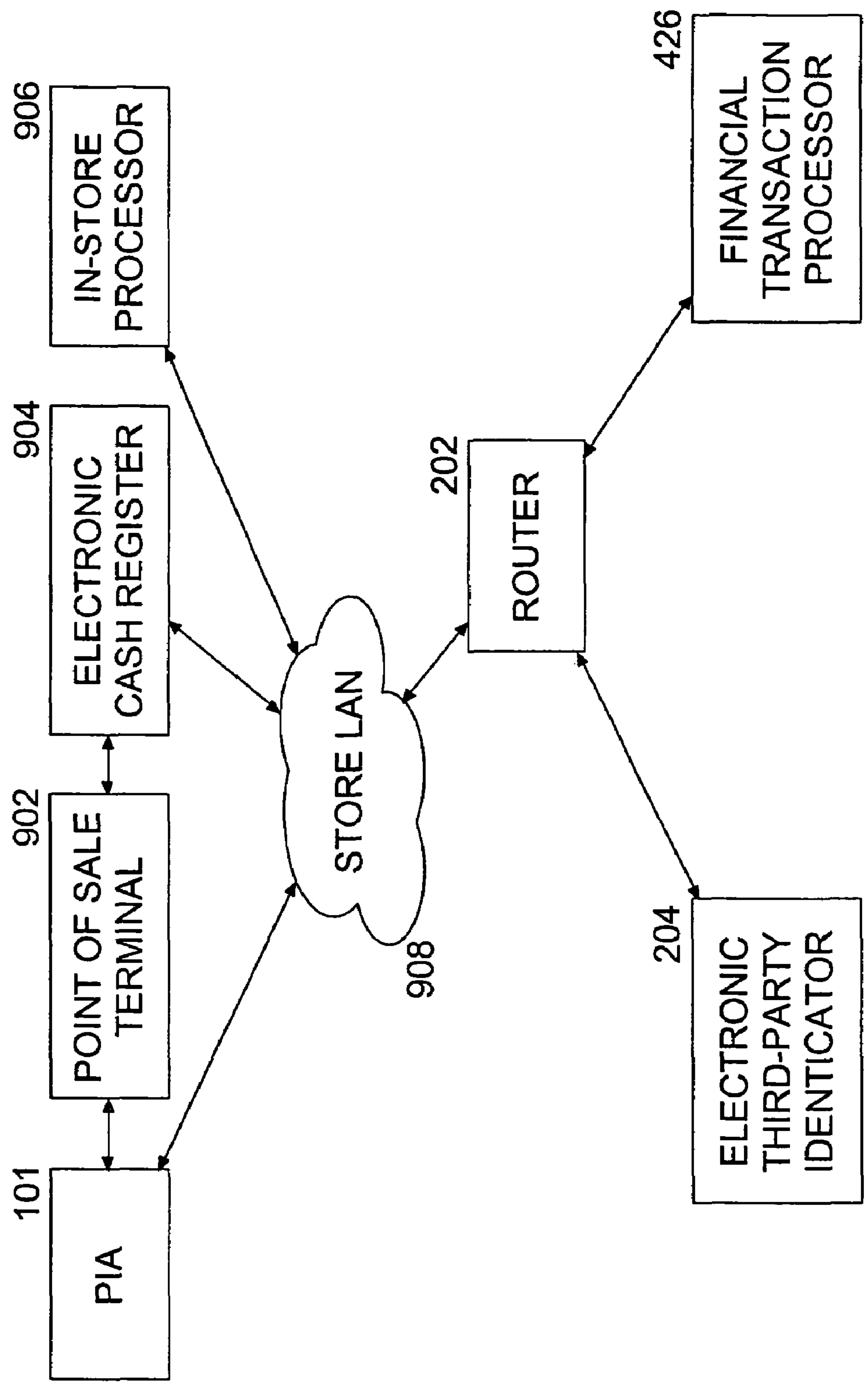
FIG. 8 is a block diagram that shows the components that comprise the system according to the invention in a retail point-of-sale transaction at a typical supermarket or other multi-lane retailer.

Execution by the financial transaction processor may result in a declined transaction due to lack of funds or other problem condition reported by the credit/debit network. If the transaction is declined, the in-store system notifies the payor, and the payor may either cancel the transaction, or provide another account from which to originate payment. A block diagram of the components that comprise the system in a typical retail point-of-sale transaction is shown in FIG. 8.

Network Point-of-Sale Transactions

Network point-of-sale transactions are characterized by identifying the payor using the payor's bid biometric sample submitted through the payor's personal PIA 101, or through a public PIA attached to an ATM, point-of-sale terminal 902 and electronic cash register 904, or other public terminal. The payee is a registered network merchant, and is identified through a digital certificate. Thus the payor is identified through biometrics, while the payee is identified through the verification of a digital certificate issued by an authorized certifying authority.

In a preferred embodiment, the payor first locates the payee by locating the seller's place of business on the network: the web site, using the network address of the payee. The payor downloads the payee's digital certificate to the PIA that the payor is using. The PIA verifies that the digital certificate provided by the payee is a valid certificate.

The payor then submits a bid biometric sample obtained from their physical person using the PIA's biometric sensor 102. The PIA determines that the biometric scan is non-fraudulent, and then translates and compresses that biometric scan into a format suitable for rapid transmission to the DPC. Preferably, the payor then enters a PIN code into the PIA keypad 106.

The PIA 101 transmits the biometric-PIN to the DPC 204 for identification, along with the payee's digital certificate. The PIA 101 can transmit the biometric-PIN to the DPC 204 via store network 908. The DPC identifies the payor, and retrieves the list of credit/debit accounts that the payor has previously registered with the system, and transmits this list back to the PIA. The payor optionally chooses from among a list of financial accounts, or the payor may have only one financial account from which payment may be made, in which case the payor's account is selected automatically.

Once the account is selected, the PIA transmits the selected account information to the DPC, which relays it to the payee. The payee then forwards the information to a financial transaction processor 426 for authorization or execution of the transaction.

Execution by the financial transaction processor may result in a declined transaction due to lack of funds in the account, a closed account, or some other immediately detectable problem condition. If the transaction is declined, the payee transmits the decline notification back to the payor, and the payor may either cancel the transaction, or select another account from which to originate payment if another account exists.

Private Code

In one embodiment, a private code, which is distinct from a personal identification number (PIN) and not used in a payor identification step, and is preferably chosen by the user, is transmitted to the PIA 101 from the DPC 204, and presented to either the payor or payee subsequent to a successful identification using biometrics. This private code identifies the authorization system to the payor or payee users. The private code is selected by the payor or payee during registration with the third party identicator 204, and is never entered into the PIA during a transaction authorization. Additionally, the PIA and DPC always transmit the private code in an encrypted form. As a result, only the authentic DPC and PIA can provide a person's private code after a successful identification. The private code is displayed to the payor to validate that the authentic electronic third party identicator has processes the transaction.

Other Features

The transaction amount can include data that is necessary for conducting a transaction such as price information, a list of goods and services, a payee name, a date or time, a location, or an invoice number, but can be just an amount.

The transaction acceptance step optionally further comprises the payor entering a new transaction amount, which is the sum of a cash back amount and the transaction amount, for the financial transaction.

Preferably, in a payor re-registration step, the user's registration biometric samples are compared against previously designated biometric samples wherein, if a match occurs, the computer system is alerted to the fact that the payor has re-registered with the ETPI.

Also preferably, in a biometric theft resolution step, where the payor uses a biometric-PIN identification subsystem, the payor's personal identification number is changed whenever the payor's biometric sample is determined to have been fraudulently duplicated.

Optionally, during the payor registration step, the payor registers at least one payor financial account identifier and assigns an account index code to each payor financial account identifier, and, after the payor has been identified, the user adds the account index code to the financial transaction, wherein the account index code further comprises one or more alphanumeric characters.

In another embodiment, the payor can be a representative of a business entity that has permission to access the business entity's credit/debit accounts to purchase items on the network.

From the foregoing, it will be appreciated how the objectives and features of the invention are met. First, the invention provides an electronic payment computer system that eliminates the need for a payor to possess and present any personalized man-made tokens, in order to authorize a transaction.

Second, the invention provides an electronic payment computer system that is capable of determining a payor's unique personal identity, as opposed to verifying possession of personalized objects and information.

Third, the invention verifies the payor's identity based upon one or more unique characteristics physically personal to the user.

Fourth, the invention provides a cost-effective electronic payment system that is practical, convenient, and easy use, and readily integrates tokenless payor identification using biometrics with pre-existing credit/debit payment systems.

Fifth, the invention provides a system of secured access to a computer system that is highly resistant to fraudulent transaction authorization attempts by unauthorized users, and also to interception of customer credit or debit card account numbers by a dishonest store clerk or telephone sales operator.

Although the invention has been described with respect to a particular tokenless authorization system and method for its use, it will be appreciated that various modifications of the apparatus and method are possible without departing from the invention, which is defined by the claims set forth below.

The invention claimed is;

1. An authorization device for transferring funds from a payor financial account to a payee financial account, said device comprising:

A data processing center comprising one or more databases wherein the payor registers a registration biometric sample associated with at least one payor financial account identifier and a payee registers payee identification data, the data at least including a payee place of business;

A party identification apparatus configured for receiving and verifying payee digital certificate data and having a biometric sensor for input of a biometric sample;

Communication lines for transmission of payee digital certificate data between a payee place of business and a party identification apparatus;

Communication lines for transmission of a payor biometric sample and payee digital certificate data between a party identification apparatus and the data processing center;

Communication lines for transmission of a payor financial account identifier between the data processing center and a payee;

A comparator engine for comparing a bid biometric sample to at least one registration biometric sample, and The system being arranged so that the biometric sample is sent to the comparator engine only if the payee digital certificate data is verified and a message containing the payor's financial account identifier is sent from the data processing center to the payee only if the bid and registration payor biometric data match and the bid and registration payee digital certificate data match.

2. The authorization device of claim 1, including:

means coupled to the party identification apparatus for receiving a message including one or more payor financial account identifiers from the data processing center;

means coupled to the party identification apparatus for selecting one or more preferred financial account identifiers to use in processing the transaction; and means for transmitting the one or more selected payor financial account identifiers to the data processing center.

3. The authorization device of claim 1, wherein no credit/debit card, smartcard or a paper check is used by the payor to conduct the financial transaction.

4. The authorization device of claim 1, wherein the payee identification data further comprises any one of the following: a payee hardware ID code, a payee telephone number, a payee email address, a payee digital certificate code, a payee account index, a payee financial account number, a payee biometric, and a payee biometric and PIN combination.

5. The authorization device of claim 1, wherein the payor registration biometric sample is associated with a PIN, the PIN used by the authorization device for identification the payor.

6. The authorization device of claim 1, including means for the payee to receive the message and transmit the payor financial account identifier and a transaction amount to a financial transaction processor via the payee to authorize a payment from the payor's financial account to the payee.

7. The authorization device of claim 1, wherein a subset of the payor registration biometric samples are stored in a payor re-registration database to which the comparator engine compares a payor's registration biometric samples and if a match occurs, alerts the authorization system to the fact that the payor has re-registered with the payment authorization system.

8. The authorization device of claim 1, wherein the computer data processing center and the comparator engine are included in an electronic third party identicator.

9. The authorization device of claim 1, wherein the message containing the payor's financial account identifier(s) is sent to the PIA from the computer data processing center.

10. The authorization device of claim 1, wherein the transaction amount includes a new transaction amount, the new transaction amount being the sum of a cash back amount and a transaction amount.

11. A method for authorization of an electronic payment between a payor and a payee using an electronic third party identicator, said method comprising the steps of:

a payee transmission step, wherein payee digital certificate data and transaction data are electronically forwarded to a payor personal identification apparatus;

a payee verification step, wherein the payee digital certificate data is verified authentic at the payor party identification apparatus;

a payor biometric sample collection step, wherein at least one payor bid biometric sample is obtained from the payor's person;

at least one transmission step, wherein the payor bid biometric sample and payee digital certificate data are electronically forwarded from the party identification apparatus to the third-party electronic identicator;

a payor identification step, wherein the electronic third party identicator compares the payor bid biometric sample with at least one registered biometric sample for producing either a successful or failed identification of the payor;

a payee identification step, wherein the electronic third party identicator compares the payee's digital certificate data with registered payee digital certificate data for producing either a successful or failed identification of the payee;

an identification response step, wherein upon successful identification of the payor and payee, the electronic third-party identicator electronically forwards at least one payor financial account identifier to the payee;

a transaction execution step, wherein an electronic financial transaction is formed between the payor and the payee, comprising a transaction amount and a payor financial account identifier, and the financial transaction is electronically forwarded by the payee to a financial transaction processor for authorization;

wherein upon successful identification of the payor and authorization of the financial transaction by the financial transaction processor, a biometric-based authorization of an electronic payment is given to transfer funds from the payor's financial account to a payee's financial account.

12. The method of claim 11, further comprising a payor registration step, wherein the payor registers with an electronic third party identicator at least one registration biometric sample and at least one payor financial account identifier.

13. The method of claim 12, wherein the payor registration step further comprises registering a payor personal identification number with the electronic third party identicator, which is used by the electronic third party identicator to assist in identification of the payor.

14. The method of claim 12, further comprising a payor re-registration step, wherein the user's registration biometric samples are compared against previously designated biometric samples wherein if a match occurs, the electronic third-party identicator is alerted to the fact that the payor has re-registered.

15. The method of claim 11, further comprising selecting by the payor the type of financial account to be debited.

16. The method of claim 15, wherein the type of financial account is selected from a list comprising one or more of: credit, debit, checking, and stored value.

17. The method of claim 11, further comprising an approval step wherein the transaction amount is displayed to the payor, and the payor indicates acceptance of the transaction before the transaction is forwarded to the financial transaction processor.

18. The method of claim 11, further comprising a transaction payment step, wherein the transaction amount is debited from a payor's financial account.

19. The method of claim 18, wherein the transaction amount is credited to the payee's financial account.

20. The method of claim 11, wherein the biometric sample comprises of one of the following: a fingerprint, a facial scan, a retinal image, an iris scan, and a voice print.

21. A method according to claim 11, further comprising a payee registration step, wherein the payee registers a payee identification data at least including digital certificate data with the electronic third party identicator.

22. The method of claim 21, wherein the payee identification data further comprises any one of the following: a payee hardware ID code, a payee telephone number, a payee email address, a payee digital certificate code, a payee account index, a payee financial account number, a payee biometric, and a payee biometric and PIN combination.

23. The method of claim 11, wherein the transaction amount further includes a new transaction amount, the new transaction amount being the sum of a cash back amount and a transaction amount.

* * * * *